UNITED STATES PATENT OFFICE.

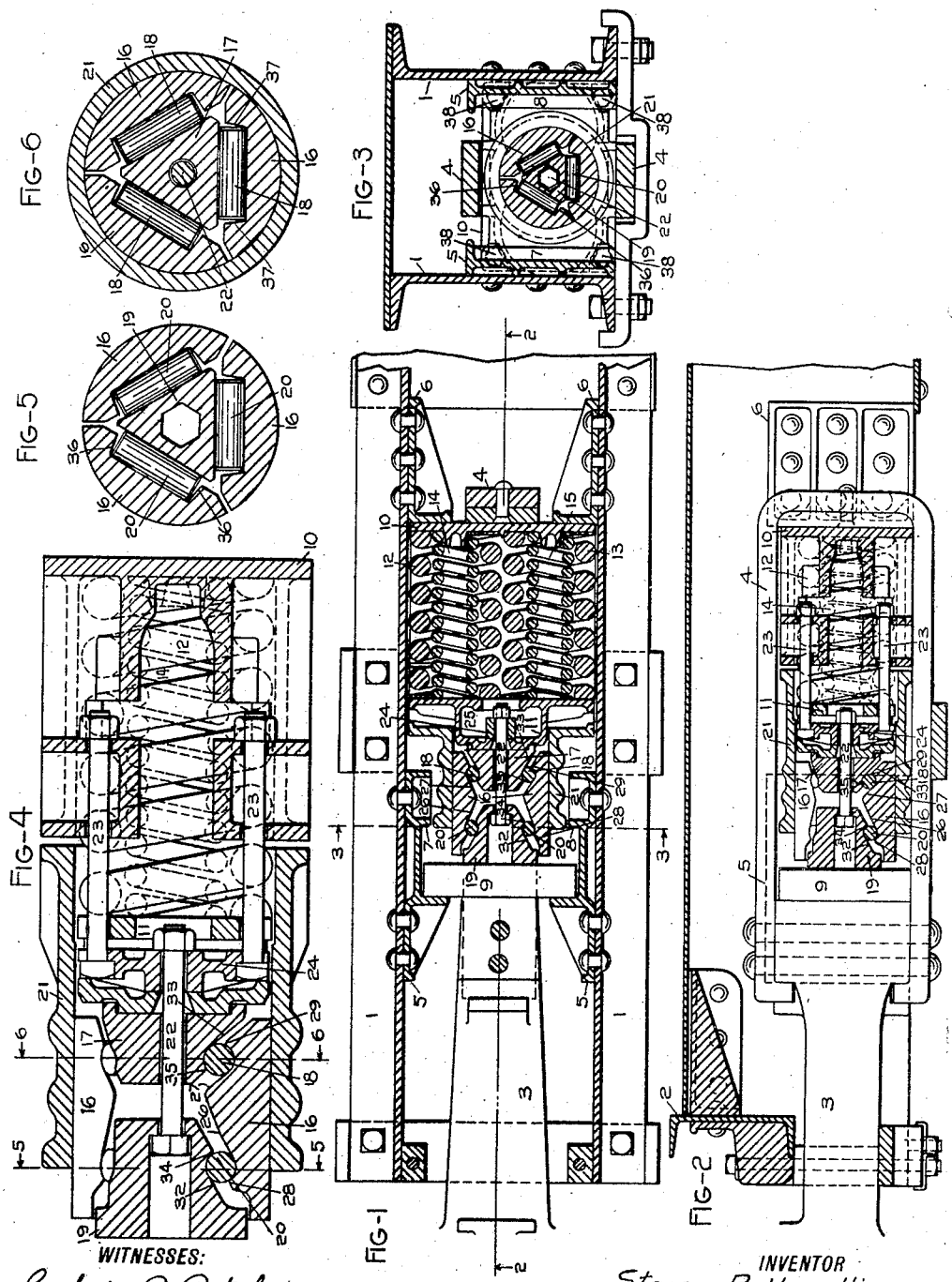

STACEY B. HASELTINE, OF CHICAGO, ILLINOIS, ASSIGNOR TO WILLIAM H. MINER, OF CHICAGO, ILLINOIS.

FRICTION DRAFT-RIGGING.

1,093,778.

Specification of Letters Patent.

Patented Apr. 21, 1914.

Application filed January 16, 1911. Serial No. 603,014.

*To all whom it may concern:*

Be it known that I, STACEY B. HASELTINE, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars.

The object of my invention is to provide an improved construction of friction draft rigging which will be strong, efficient and durable and of simple construction, and have a high cushioning capacity, and in which the pressure of the friction shoes against the friction shell will be properly distributed throughout the length of the shoes.

My invention consists in the means employed to practically accomplish this result as herein shown and described, the same comprising in connection with the draw-bar, draft yoke, stop members and followers, a pair of twin springs arranged side by side, a twin spring cage or follower, a twin spring bearing member, a friction shell and friction shoes within the shell, a wedge and anti-friction rollers interposed between the draw-bar and the friction shoes at the front end thereof, and a wedge and anti-friction rollers interposed between the twin spring bearing member and the friction shoes at the rear end thereof.

My invention also consists in the novel construction of parts and devices and in the novel combinations of parts and devices herein shown and described and more particularly specified in the claim.

In the accompanying drawing forming a part of this specification, Figure 1 is a plan view, partly in horizontal section of a friction draft rigging embodying my invention. Fig. 2 is a side elevation, partly in longitudinal section on line 2—2 of Fig. 1. Fig. 3 is a cross section on line 3—3 of Fig. 1. Fig. 4 is a detail, vertical, longitudinal section of the friction shell, twin spring cage or follower and contained parts. Fig. 5 is a detail cross section on line 5—5 of Fig. 4 and Fig. 6 is a detail cross section on line 6—6 of Fig. 4.

In the drawing, 1 represents the center sills or draft members of a railway car, 2 the end sill, 3 the draw-bar, 4 the draft yoke, 5, 6 front and rear main stops secured to the draft sills, 7, 8 limiting stops, 9 the front follower, 10 a twin spring cage or rear follower, 11 the twin spring seat or bearing member against which the twin springs 12, 13 bear at their front ends and through which the pressure of the twin springs 12, 13 and supplemental twin springs 14, 15 nested within the springs 12, 13, is transmitted to the friction shoes 16 through the interposed supplemental wedge 17 and anti-friction rollers 18. The pressure ne draw-bar 3 and front follower 9 is transmitted to the friction shoes through the interposed main wedge 19 and anti-friction rollers 20.

21 is the longitudinally movable friction shell having an internal friction face engaging the external friction faces of the friction shoes 16.

The main wedge 19 is connected to the rear twin spring follower or cage 10 by connecting bolts 22, 23, 23 through the interposed bridge member 24 which fits in a suitable chamber or recess 25 in the twin spring seat or bearing member 11, thus holding all the parts assembled within the friction shell 21 and spring cage 10.

The friction shoes 16 are preferably three in number, and each is provided with two wedge faces 26, 27, one at each end thereof and each having a shoulder 28 and 29 to hold the anti-friction rollers 18, 20 in place, which are interposed between the friction shoes and the corresponding wedge faces 32, 33 of the main and supplemental wedges 19 and 17 respectively. The main and supplemental wedges have corresponding shoulders 34, 35 for engagement with the anti-friction rollers. And the friction shoes are also provided with shoulders 36, 36 and 37, 37 for engagement with the ends of the rollers to keep the rollers properly in position between the friction shoes and main and supplemental wedges respectively. The main wedge 19 is preferably more acute than the supplemental wedge 17. The relatively blunt supplemental wedge, in connection with the main wedge serves to distribute the load or spreading pressure to the friction shoes properly from end to end thereof while at the same time the relatively blunt supplemental wedge does not exert so much spreading pressure against the shoes as to prevent the friction cushioning mechanism from properly releasing through the action of the twin springs, the stored energy of both compressed springs coöperating to effect the release, and the anti-friction rollers co-acting with the twin springs to effect the release. The twin spring rear follower or spring cage 10 is connected to the friction shell 21 by connecting bolts 38, preferably located at the corners of the spring cage 10 and friction shell and indicated in dotted lines in the drawing.

In my invention the supplemental wedge and anti-friction rollers at the rear end of the friction shoes also have a special co-active function with the powerful twin springs in causing the friction shoes and friction shell to exert a spring dampening function in the release movement and thus preventing all possibility of violent, sudden or injurious release or rebound movement of the springs after they are compressed.

I claim:—

In a friction draft rigging, the combination with a draw-bar, draft yoke, twin springs, a twin spring follower and a twin spring bearing member, of a friction shell, friction shoes within the shell, a supplemental wedge and anti-friction rollers interposed between said twin spring bearing member and the friction shoes, and a main wedge and anti-friction rollers interposed between the draw-bar and friction shoes, substantially as specified.

STACEY B. HASELTINE.

Witnesses:
PEARL ABRAMS,
EDMUND ADCOCK.